Dec. 14, 1926.
C. J. RODMAN ET AL.
DEOXIDIZER
Filed Dec. 21, 1923
1,610,592
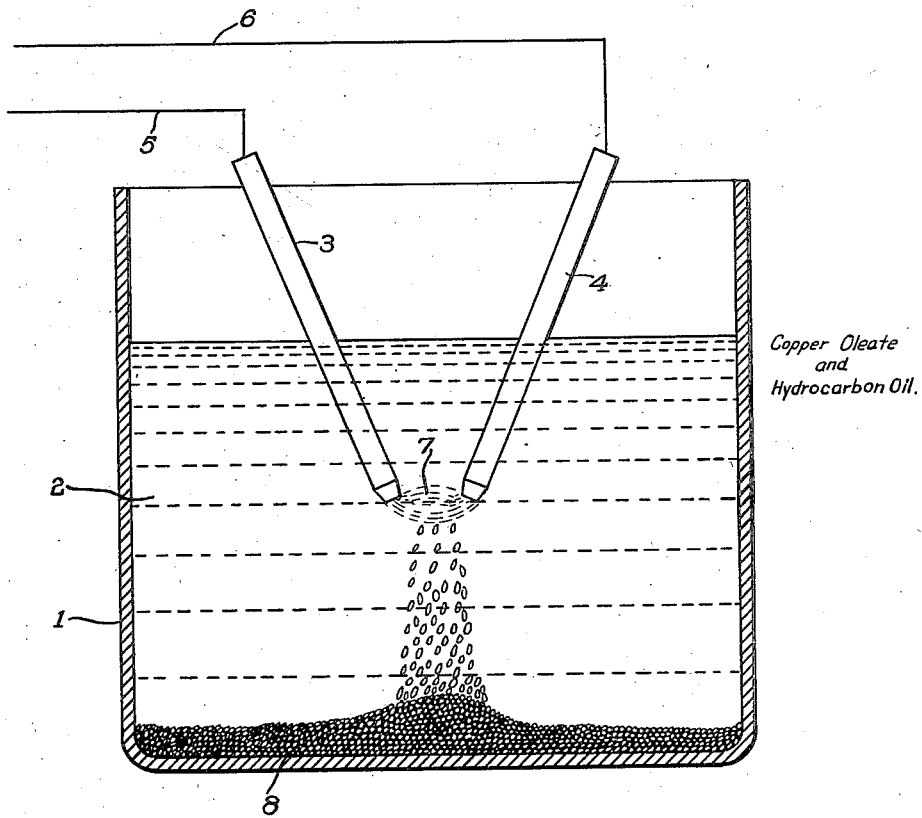
WITNESSES:
INVENTORS
Clarence J. Rodman and
James G. Ford
BY
ATTORNEY Patented Dec. 14, 1926.

1,610,592

UNITED STATES PATENT OFFICE.

CLARENCE J. RODMAN AND JAMES G. FORD, OF WILKINSBURG, PENNSYLVANIA, ASSIGNORS TO WESTINGHOUSE ELECTRIC AND MANUFACTURING COMPANY, A CORPORATION OF PENNSYLVANIA.

DEOXIDIZER.

Application filed December 21, 1923. Serial No. 682,074.

This invention relates to means for removing oxygen from atmospheres containing the same, more particularly to the removal of oxygen from the spaces above the oil in electrical apparatus such as transformers, circuit breakers, oil switches and the like.

In such electrical apparatus, the space above the oil is generally filled with air and upon an arm forming in the oil, accidentally or during the normal operation of the device, combustible gases which mix with the air are produced, forming an explosive mixture. This mixture has, on different occasions, been ignited by arcs within the apparatus, causing explosions which damaged the apparatus and endangered the lives of the workmen.

To overcome this difficulty it has been proposed to provide a material, either in the space above the oil or in communication therewith, which is capable of removing the oxygen from said space, and thus prevent the formation of explosive mixtures.

Our invention relates to materials of this character, it being among the objects thereof to provide a material capable of removing oxygen from atmospheres which shall be highly efficient in operation and which may be produced at a low cost.

In practising our invention, we provide a mixture of finely divided copper and carbon intimately mixed and in an extremely active state. This mixture may be prepared in a variety of ways, but we prefer to make the same by subjecting a hydro-carbon oil containing a copper soap, to a high potential arc. This breaks down the oil to provide finely divided carbon which is in a highly reducing condition and, therefore, is very active. Together with the carbon, there is precipitated very finely divided copper which is obtained by the decomposition of the copper soap. The mixture is filtered, washed with ether to remove all traces of oil, and is then dried.

The mixture has been found to be very reactive with the oxygen of the air. The rate of reaction may be so rapid that in the open air spontaneous combustion may occur and the carbon be burned to carbon dioxid and the copper to cuprous and cupric oxides. Apparently, the carbon is in activated form and it catalyzes the oxidation of the copper, at the same time reacting with oxygen to form carbon dioxide.

If it is desired to accelerate the reaction in a closed container, we may add to the mixture of copper and carbon a small quantity of a salt such as cupric nitrate, ammonium chloride or the like.

In the accompanying drawing, constituting a part hereof, the single figure is a vertical cross-sectional view of an apparatus suitable for carrying out our process.

The tank or container 1 is filled to a suitable point with a mixture 2 of a hydrocarbon oil and copper oleate or other fatty acid soap of the metal to be precipitated. Electrodes 3 and 4 of carbon or other suitable material are connected to leads 5 and 6, respectively, which are connected to a suitable source of high voltage.

Current is passed between electrodes 3 and 4 forming a high-tension arc 7, which, acting upon the mixture 2, causes decomposition thereof, forming finely divided copper and carbon together with a certain amount of gas, which is given off. The copper and carbon material 8 settles to the bottom of the container 1 and is removed therefrom in any suitable manner. The material is centrifuged, washed with ether or other suitable solvent for the mixture 2, and dried ready for use.

Although we have described our invention setting forth a specific embodiment thereof, it is obvious that various changes may be made therein within the scope of our invention. For instance, instead of carbon electrodes, we may utilize electrodes of chromium or platinum, which have high resistance to corrosion. We may omit the copper soap and utilize instead thereof, electrodes of copper or brass which, under the influence of the arc produce copper in finely divided form, which provides a mixture with the carbon liberated from the oil. Any type of hydro-carbon oil which has been refined to remove sulphur, acid and asphaltic products may be used. Generally, an oil heavier than kerosene is preferred.

The particles of the material produced by our process may be varied in size by varying the electrical characteristics of the source of energy. Generally, we prefer to use a high-frequency high-voltage source with a low current in order to obtain very finely divided particles. Using a low voltage and a high current gives larger particles.

We claim as our invention:

1. A material for deoxidizing atmospheres comprising a mixture of a plurality of oxidizable constituents, one of which is finely divided carbon and another is copper, said material being so finely divided as to be capable of spontaneous combustion.

2. A material for deoxidizing atmospheres comprising a mixture of finely divided copper and finely divided carbon, said material being capable of spontaneous oxidation.

3. A method of making deoxidizing material which comprises immersing metal containing electrodes in oil and then subjecting said oil to the action of an arc.

4. A method of making deoxidizing material which comprises providing an oil containing cuprous material and then subjecting said oil to the action of an arc between electrodes immersed in said oil.

5. A method of making deoxidizing material which comprises mixing an organic compound of copper with an oil, immersing electrodes in said mixture and then subjecting said mixture to the action of an arc between said electrodes.

6. A method of making deoxidizing material which comprises subjecting a solution of a hydro-carbon oil and a copper fatty acid compound soluble in the said oil, to the action of an arc.

7. A method of making a deoxidizing material which comprises immersing terminal electrodes in a bath of oil associated with a cuprous metal and then subjecting the bath to the action of an arc.

8. A method of making a deoxidizing material which comprises immersing terminal electrodes in a bath of oil associated with copper and then subjecting the bath to the action of an arc.

9. A method of making a deoxidizing material which comprises immersing terminal electrodes in a bath of oil associated with copper oleate and then subjecting the bath to the action of an arc.

10. A method of making a deoxidizing material which comprises immersing terminal electrodes in a bath of oil associated with a fatty acid salt of copper and then subjecting the bath to the action of an arc.

In testimony whereof, we have hereunto subscribed our names this 17th day of December, 1923.

CLARENCE J. RODMAN.
JAMES G. FORD.